Sept. 29, 1942.  A. QUENTIN  2,297,246
APPARATUS FOR USE IN GLASS TEMPERING
Filed July 28, 1939  3 Sheets-Sheet 1
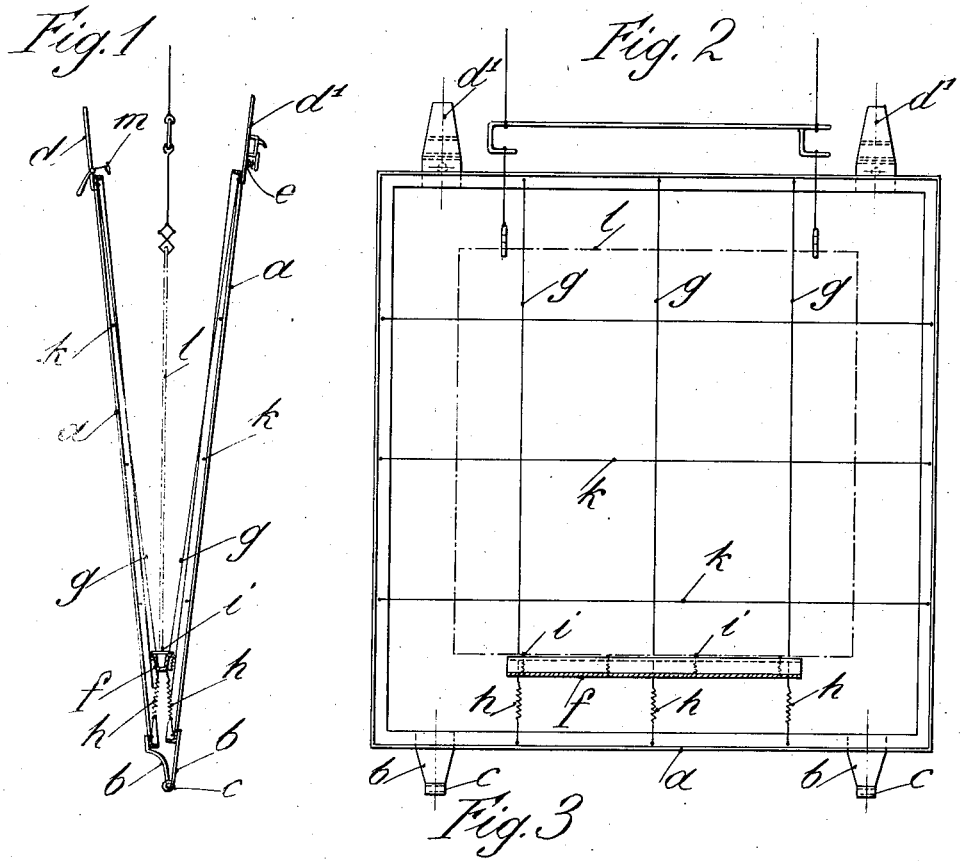
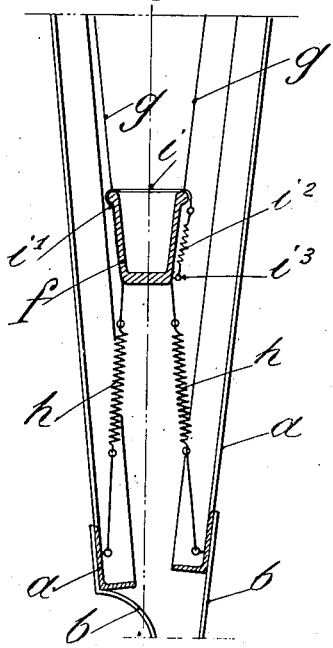
Alberto Quentin
INVENTOR

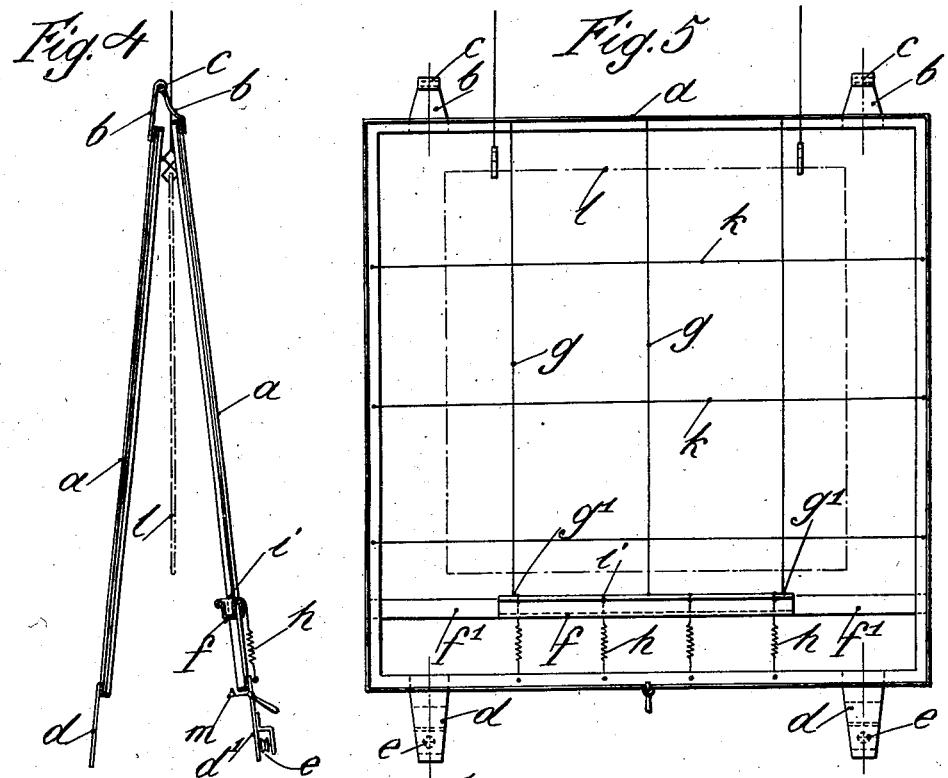
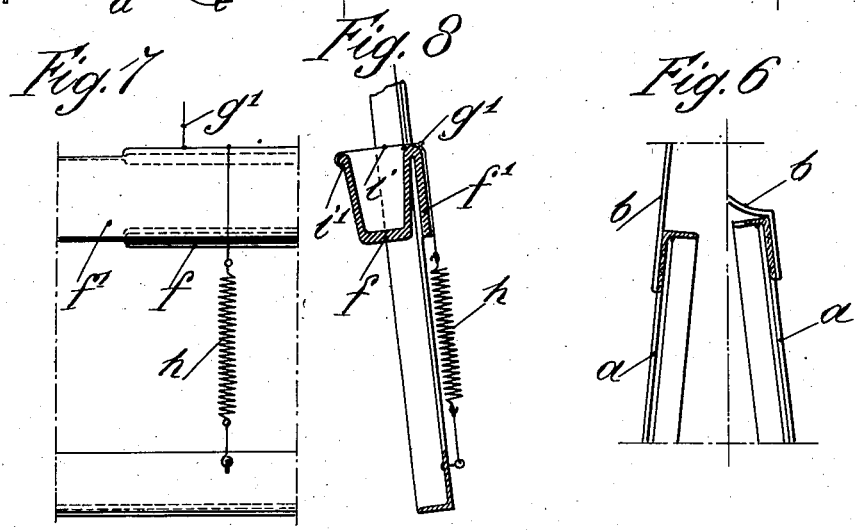

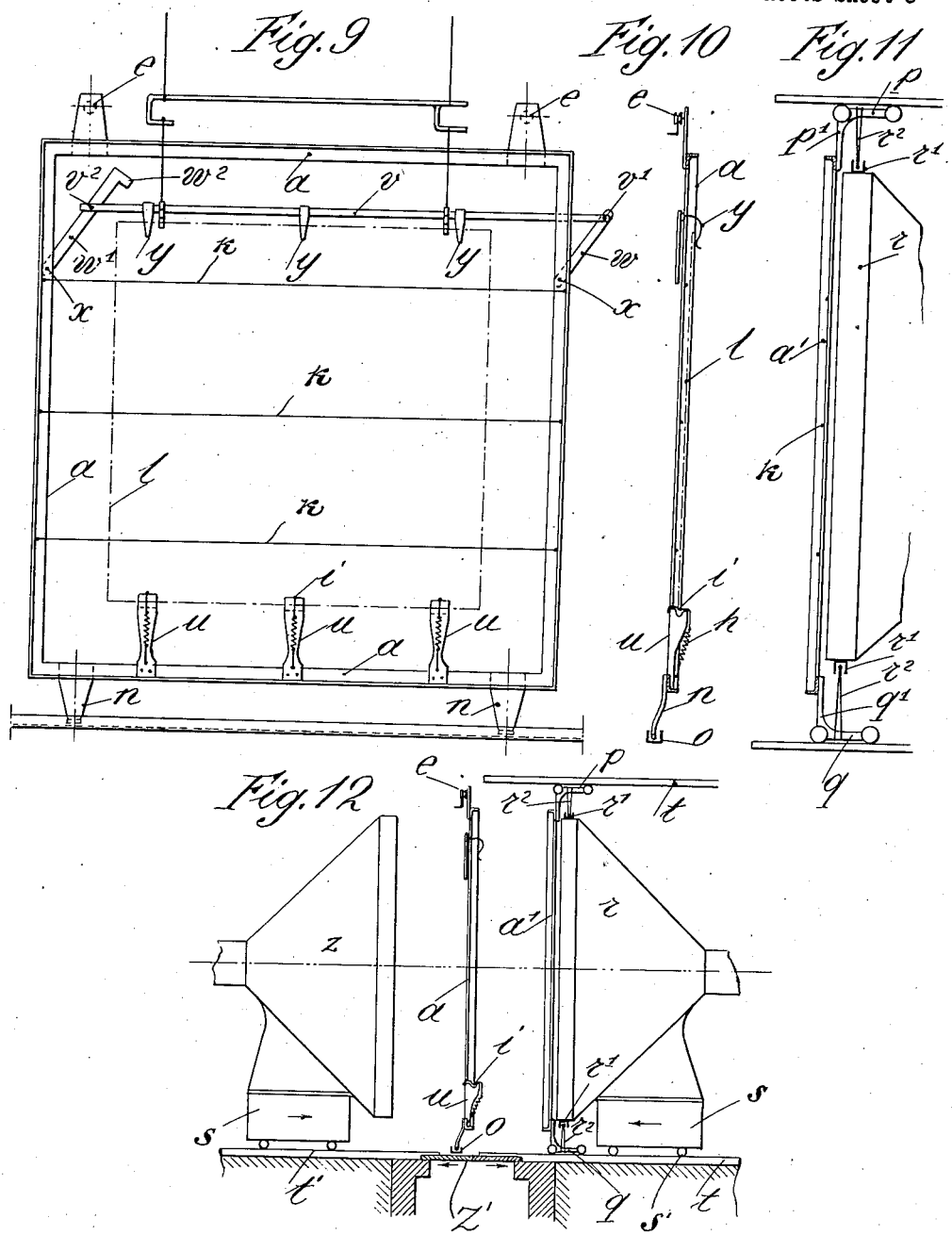

Patented Sept. 29, 1942

2,297,246

UNITED STATES PATENT OFFICE 2,297,246

APPARATUS FOR USE IN GLASS TEMPERING

Alberto Quentin, Milan, Italy; vested in the Alien Property Custodian

Application July 28, 1939, Serial No. 287,028
In Germany August 2, 1938

8 Claims. (Cl. 49—45)

This invention relates to glass tempering apparatus, and is more particularly concerned with the support and movement of glass sheets during tempering operations.

In the tempering of glass, the soft sheets are taken directly from the furnace and disposed between two closely adjacent blowers which direct cooling blasts of air against both sides thereof to bring about tempering. The support of the glass sheet in its movement from the furnace to and between the tempering blowers is fraught with some difficulty. Clearly, there are a number of ways in which the sheet might be supported were it not for the fact that it is quite soft and the surface must be exposed to the tempering blasts so that uniform tempering will occur.

One particular difficulty which has been encountered is the striking of the glass sheet against one of the blowers at the moment when it is to be inserted in the space between them. This will result in permanent distortion of the sheet which must then be rejected and treated as waste. Such collisions are brought about because the glass is, according to prior art practices, suspended from long wires which permit appreciable swinging movement of the sheet during transportation.

The invention provides improvements which permit the successful utilization of these wires. Essentially, it comprises a frame which allows the sheet to be contained, guided and supported in a manner to insure the maintenance thereof equidistant from the blowing surfaces. The glass sheet is caused to exactly traverse the median line between the blowing surfaces even when the latter are very close together, while the tendency of the air to bodily displace the sheet is overcome. Thus, any collision with the blowers is avoided, even if the glass sheets are of reduced dimensions and thickness, and yet the supports are sufficiently elastic so as to obviate deformations or fractures, as well as to insure a soft support for the sheet issuing from the furnace. Release from the holding elements of the frame is likewise facilitated. Furthermore, according to the invention, the mechanical retention of the sheet is such that tilting between the blasts with consequent irregularities in the effect of the nozzles is prevented. Jarring of the glass sheet is thus avoided, or any approach of the vertical edges thereof towards the nozzles; such jarring, when present, leading to an unbalanced tempering in the various sheet zones.

A glass sheet supporting frame constructed according to this invention receives the sheet on its issuing from the furnace. To this end it is double, opening like a book or through the moving of one frame-portion apart from the other. The said frames are rigidly and positively guided on opposite sides by means of pulleys and rails. The frame is thus also converted into a support for the sheet during the tempering and cooling processes. According to this invention the sheet is enabled, through the medium of this frame, to be released forthwith from the holdfasts by which it had been retained during its heating; and owing to the fact that these holdfasts take up at least twice as much room as the frame, the sheet supported by the frame forming the object of the invention may be brought much closer to the blowing elements than has hitherto been permitted due to presence of the holdfasts.

The invention will be best understood on following the specification and the accompanying drawings, which show various examples of the application of the said invention.

In these drawings:

Fig. 1 shows, in transverse section, a frame opening like a book, for sheets arriving from above or from the sides;

Fig. 2 shows the same frame in longitudinal section;

Fig. 3 shows, also in section, a detail of the lower portion of the said frame;

Fig. 4 shows, in transverse section, another type of frame, opening like a book, for sheets arriving from below or from the sides;

Fig. 5 shows the frame of Fig. 4 in elevation.

Fig. 6 shows, in section, a detail of the upper portion of the double frame;

Fig. 7 shows, in a front view, a detail of the lower portion of the double frame;

Fig. 8 shows the said detail in cross section;

Fig. 9 shows, in a front view, a simple carrying frame, viz. one adapted to support the glass sheet;

Fig. 10 is a cross section of the said frame;

Fig. 11 shows laterally, and also in section, the other frame-portion to be coupled with the first, carried by the same running elements as the blowing caisson; and Fig. 12 shows in a front view and partially in section, the utilization of the example of Figs. 9, 10 and 11 for a furnace situated below.

According to the examples shown in Figs. 1, 2 and 3, the frame actually consists of a couple of frames, each formed by shaped portions *a* being, for preference, L shaped in section. The said frames are held at their lower part by two divaricating limbs *b—b* whose free ends unite to form a hinge $c$, to act as a guide along a special rail. The said hinges allow of the opening out or unfolding of the frames at their upper part.

Upon the upper traverse thereof, each frame carries two projections $d$—$d^1$ adapted to engage with the furnace door sliding organs.

Upon each projection $d^1$ there is represented a small wheel $e$ destined to rotate and cause the running of the whole frame-work upon special upper guide-ways. Thus, the entire frame-work is guided both above and below.

In a downward direction, and between the two frames, there is located a hollow bar $f$ having a U shaped section the divaricating limbs of which are directed upwardly.

Metal wires starting from the upper traverse of each frame contact with, and support, the bar $f$ and, extending downwardly, are conjoined with the springs $h$ whose lower extremities are fixed to the lower traverse of each single frame.

In this manner the bar $f$ is resiliently suspended.

At the upper part of the said rod $f$ are located further metal wires $i$, one end of which $i^1$, see Fig. 3, is fixed to the outside of a limb of the U, while the other end of the wire $i$ traversing, at the upper part, the hollow portion of the rod $f$ is provided with a spring $i^2$ affixed at $i^3$ to the base of the bar $f$.

Thus, the said wires $i$ are resilient, and the sheet $l$ (Figs. 1 and 2) coming from above or from the sides, is caused to rest upon the said wires, so that the lower support of the said sheet is not rigid.

To the lateral uprights of the two semi-frames are fixed the transverse wires $k$.

While the sheet is descending out of the furnace, or issuing laterally from the lower part thereof, the whole frame-work is moved towards same, running on the guide-ways as already mentioned, and as soon as the sheet has entered in between the two branches of the frame, the said branches close, and a pawl $m$ engaging the upper portion of the opposite semi-frame, keeps the said frame closed, so that the sheet within its frame, disengaged from the holdfasts from which it was suspended, may be conveyed to between the blasts, or any other tempering means.

In the examples according to Figs. 4 to 8 inclusively, a modification of the invention is shown for use when the sheet arrives from below. In this instance, the frame, as just described, is completely overturned, as shown in Fig. 4. In the said Figs. 4 to 8, the same elements forming the frame according to Figs. 1 to 3 are indicated by like reference characters. However, the bar $f$ upon which the supporting wires $i$ are located is not situated at the centre of the two semi-frames, but is carried from a single semi-frame, by extensions $f^1$ which engage the lateral uprights of the frame-work.

The wires $i$ in this case though affixed at one end at $i^1$ pass across the upper portion of the rod $f$ and extend downwardly to the spring $h$ whose lower extremity engages the frame base.

The vertical wires $g$ starting from the upper traverse of the frame, are fixed at $g^1$ (see Fig. 8) to the bar $f$, while the transverse wires $k$ engage the two uprights of each frame.

The branches or limbs $b$—$b$ are, in this case, above, in point of position, with their hinges $c$, and the small runners $e$ below.

Means which form no part of this invention, and which may be of any kind, must be provided for enabling the frame to close again as soon as it has received the sheet; these means must, of course, provide likewise for the shifting of the guide-rail for the runners $e$.

The examples shown in Figs. 9 to 12 indicate a further modification of the invention where the furnaces are located beneath the frame.

The frame-work is formed of the two mutually independent frames $a$—$a^1$. One of the said frames is guided at its upper part by the rollers $e$, and below, by the projections $n$ which are enabled to slide along the guide-ways $o$. This frame may run backwards and forwards. The other frame—on the contrary—is connected to the two shifting carriers $p$—$q$ which carry a resiliently suspended blower $r$. This suspension is constituted by guide-ways $r^1$, fixed above and below the blower; and from the latter there extend the resilient supports $r^2$ which engage the two carriers $p$—$q$.

This resilient suspension is necessary in order to enable the free play of the blower $r$ upon its vibrator $s$ which, being integral with the said blower, carries means $s^1$ for sliding along the rails $t$ provided above and below.

Upon the appendages $p^1$ of the shifting carrier $p$ and $q^1$ of the carrier $q$, is fixed the semi-frame $a^1$ which of course, carries the wires $k$. Thus, the frame $a^1$ is moved, being carried along by the motion of the blower $r$, of which it partially forms a portion.

The frame $a$ instead, viz. the one running transversally relatively to the mouth of the furnace, carries at the lower part thereof three vertical supports $u$, in which the upper portion is recessed, while each such hollow part is traversed by the wires $i$, of which, like these already described for the other examples, one end is fixed to the outside of the support $u$ and the other end, provided with a spring $h$, is fixed to the base of the support $u$, viz. in the vicinity of the lower traverse of the frame $a$.

At its upper part the said frame $a$ carries a traverse $v$ pivoted at $v^1$—$v^2$ upon two levers $w$—$w^1$, pivoted, in turn, at $x$ to the uprights of the frame $a$.

The lever $w^1$ carries a means $w^2$ enabling the shifting to and fro of the bar $v$. To this bar are fixed small springs $y$ performing the function of holding fast the sheet $l$ when the latter—raised out of the furnace—is brought to rest upon the resilient wires $i$. The second blower $z$, also provided with a vibrator $s$, is enabled to run along the rail $t^1$.

Simultaneously with the opening of the furnace doors $z^1$ for the raising of the sheet, the frame $a$ advances towards the furnace and on its having reached the exact spot, the sheet finds itself about in the middle of the said frame $a$. Through suitable means, the sheet is permitted to lightly descend, in order to rest upon the wires $i$ and at the same time, the furnace door $z^1$ closes and the two blasts $r$—$z$, being on, approach the frame. The frame $a^1$ holds the sheet fast within its frame and the holdfasts become disengaged, due to the cessation of the traction.

It will be clear that this latter method may also serve for sheets arriving from the sides, as it is also obvious that the number of the supports $u$ and of the respective wires, may vary. In the examples indicated the number of wires carried by the frame may be varied, although three vertical wires and three horizontal wires are indicated in the drawings. The wires are provided at each end, or at one end only, with a spring that keeps them taut to the utmost degree, so as to prevent the heat of the sheet from baking them, as would happen, were they to be slack.

Should the glass to be tempered be grooved, it will be advisable for the wires to be parallel to the grooves.

Having now particularly described and ascertained the nature of my said invention and in what manner the same is to be performed, I declare that what I claim is:

1. A device for supporting glass sheets during a tempering operation comprising, two frames, means for supporting said frames in facing relationship in parallel vertical planes adapted to receive therebetween a sheet of glass, thin taut wires extending between opposite sides of each frame, said wires being adapted to prevent lateral shifting of a plate of glass, a channel member adapted to receive in the mouth thereof a portion of the lower edge of a sheet of glass, means for supporting said member from at least one of said frames in a position between the two frames near the bottom thereof with its mouth facing upwardly, and resilient means traversing the mouth of said channel member for contacting the lower edge of a sheet of glass, whereby a glass sheet may be supported totally without the use of gripping means having a compressive effect on any part thereof while air currents may have been ready access thereto.

2. A device for supporting glass sheets during a tempering operation which comprises, two frames hinged together along one edge, thin taut wires extending between opposite sides of each frame, resilient rests between the two frames, and means for supporting said resilient rests from at least one of said frames in a position to engage and support the lower edge of a glass sheet while the sheet is held against lateral displacement by the taut wires, whereby the employment of gripping jaws to hold the glass plate is avoided.

3. In association with two blowers, a device for supporting glass sheets during a tempering operation which comprises, two frames, means for attaching one of the frames to one of the blowers, a guideway, means connecting the other frame to said guideway for transverse movement with respect to the frame attached to the blower, and resilient means attached to said other frame for supporting the lower edge of a sheet of glass.

4. A device according to claim 3 in which the resilient glass supporting means comprises a hollow member attached to the transversely movable frame for the reception of the lower edge of a glass plate, resilient wires traversing said hollow member and adapted to be engaged by the lower edge of the glass plate, a bar pivotally linked to the transversely movable frame, resilient gripping means attached thereto, and a lever for shifting the bar and gripping means to and from an operative position with respect to a glass sheet, said device including thin taut wires extending between opposite sides of each frame, the wires on said transversely movable frame being adapted to coact with said gripping means to prevent displacement of the glass sheet.

5. A conveyor device for supporting glass sheets during a tempering operation which comprises, two frames, hinges connecting them together along their lower edges so that they may be moved apart to receive a plate of glass therebetween, thin, taut wires extending between opposite sides of each frame, said hinges depending downwardly to constitute guiding means adapted for cooperation with a runway slot, rollers attached to one of the frames along the upper edge thereof, said rollers being adapted for cooperation with a rail, channel means for supporting an edge of a glass plate, means for supporting said channel means from said frames in a position near the bottom thereof with its mouth facing upwardly, and resilient means extending across the mouth of said channel means to act as a rest for the lower edge of a glass sheet, which sheet will be held against lateral displacement by the thin, taut wires while cooling air has ready access thereto.

6. A conveyor device for supporting glass sheets during a tempering operation which comprises, two frames, hinges connecting them together along their upper edges so that they may be moved apart to receive a plate of glass therebetween, thin, taut wires extending between opposite sides of each frame, said hinges extending upwardly to constitute guiding means adapted for cooperation with a runway slot, rollers attached to one of the frames along the lower edge thereof, said rollers being adapted for cooperation with a rail, channel means for supporting an edge of a glass plate, means for supporting said channel means from one of said frames in a position near the bottom thereof with its mouth facing upwardly, and resilient means extending across the mouth of said channel means to act as a rest for the lower edge of a glass sheet, which sheet will be held against lateral displacement by the thin, taut wires while cooling air has ready access thereto.

7. A device according to claim 3 in which the resilient glass supporting means comprises a channel member for the reception of an edge of a glass plate, and resilient wires traversing the mouth of said channel member to form a rest for the lower edge of a glass plate.

8. A device according to claim 3 including a bar pivotally linked near the upper edge of the frame having means attached thereto for resiliency supporting the lower edge of a sheet of glass, resilient gripping means attached to said bar, and a lever connected to the frame and bar and adapted to shift the bar in a vertical plane to bring the gripping means into and out of engagement with the upper edge of a sheet of glass.

ALBERTO QUENTIN.